(12) United States Patent
Oh (10) Patent No.: US 8,548,503 B2
(45) Date of Patent: Oct. 1, 2013

(54) METHODS AND SYSTEM FOR PROVIDING LOCATION-BASED COMMUNICATION SERVICES

(75) Inventor: Vincent Oh, Seattle, WA (US)

(73) Assignee: AOL Inc., Dulles, VA (US)

( * ) Notice: Subject to any disclaimer, the term of this patent is extended or adjusted under 35 U.S.C. 154(b) by 1039 days.

(21) Appl. No.: 12/230,357

(22) Filed: Aug. 28, 2008

(65) Prior Publication Data

US 2010/0056183 A1 Mar. 4, 2010

(51) Int. Cl.
*H04W 24/00* (2009.01)
(52) U.S. Cl.
USPC .............. 455/456.3; 455/456.1; 455/414.2
(58) Field of Classification Search
USPC .............. 455/466, 403, 422.1, 456.1, 440, 455/517–519; 701/300, 200–207
See application file for complete search history.

(56) References Cited

U.S. PATENT DOCUMENTS

| | | |
|---|---|---|
| 4,837,798 A | 6/1989 | Cohen et al. |
| 5,086,394 A | 2/1992 | Shapira |
| 5,276,905 A | 1/1994 | Hurst et al. |
| 5,327,486 A | 7/1994 | Wolff et al. |
| 5,533,110 A | 7/1996 | Pinard et al. |
| 5,548,637 A | 8/1996 | Heller et al. |
| 5,557,659 A | 9/1996 | Hyde-Thomson |
| 5,608,786 A | 3/1997 | Gordon |
| 5,694,616 A | 12/1997 | Johnson et al. |
| 5,721,906 A | 2/1998 | Siefert |
| 5,742,905 A | 4/1998 | Pepe et al. |
| 5,774,670 A | 6/1998 | Montulli |
| 5,793,365 A | 8/1998 | Tang et al. |
| 5,802,470 A | 9/1998 | Gaulke et al. |
| 5,850,594 A | 12/1998 | Cannon et al. |
| 5,867,162 A | 2/1999 | O'Leary et al. |
| 5,870,744 A | 2/1999 | Sprague |
| 5,872,521 A | 2/1999 | Lopatukin et al. |
| 5,878,219 A | 3/1999 | Vance, Jr. et al. |
| 5,893,091 A | 4/1999 | Hunt et al. |
| 5,893,099 A | 4/1999 | Schreiber et al. |
| 5,920,692 A | 7/1999 | Nguyen et al. |

(Continued)

FOREIGN PATENT DOCUMENTS

| | | |
|---|---|---|
| EP | 0862304 | 9/1998 |
| EP | 1176840 | 1/2002 |

(Continued)

OTHER PUBLICATIONS

Office Action, U.S. Appl. No. 11/238,110, dated Jul. 9, 2008, 11 pages.

(Continued)

*Primary Examiner* — Chuong A Ngo
(74) *Attorney, Agent, or Firm* — Finnegan, Henderson, Farabow, Garrett & Dunner LLP (57) ABSTRACT

Systems and methods are provided for providing location-based communication services, such as location-based chat sessions and location based-data feeds. Access to a chat session or data feed may be provided to a user of a mobile device when the current location of the mobile device is determined to be within a predetermined geographic region. In one implementation, the chat session or data feed relates to content provided by members of a group or social network. In other implementations, the content related to chat session or data feed is provided by members of the general public.

8 Claims, 7 Drawing Sheets

(56) References Cited

U.S. PATENT DOCUMENTS

| | | |
|---|---|---|
| 5,940,488 A | 8/1999 | DeGrazia et al. |
| 5,946,617 A | 8/1999 | Portaro et al. |
| 5,948,058 A | 9/1999 | Kudoh et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,960,173 A | 9/1999 | Tang et al. |
| 5,987,113 A | 11/1999 | James |
| 5,991,791 A | 11/1999 | Siefert |
| 5,995,023 A | 11/1999 | Kreft |
| 6,002,402 A | 12/1999 | Schacher |
| 6,009,413 A | 12/1999 | Webber et al. |
| 6,012,051 A | 1/2000 | Sammon, Jr. et al. |
| 6,014,135 A | 1/2000 | Fernandes |
| 6,014,638 A | 1/2000 | Burge et al. |
| 6,026,403 A | 2/2000 | Siefert |
| 6,026,429 A | 2/2000 | Jones et al. |
| 6,065,047 A | 5/2000 | Carpenter et al. |
| 6,073,138 A | 6/2000 | de l'Etraz et al. |
| 6,081,830 A | 6/2000 | Schindler |
| 6,085,223 A | 7/2000 | Carino, Jr. et al. |
| 6,088,435 A | 7/2000 | Barber et al. |
| 6,134,432 A | 10/2000 | Holmes et al. |
| 6,151,584 A | 11/2000 | Papiernak et al. |
| 6,161,130 A | 12/2000 | Horvitz et al. |
| 6,166,730 A | 12/2000 | Good et al. |
| 6,175,831 B1 | 1/2001 | Weinreich et al. |
| 6,199,103 B1 | 3/2001 | Sakaguchi et al. |
| 6,212,550 B1 | 4/2001 | Segur |
| 6,249,740 B1 | 6/2001 | Ito et al. |
| 6,260,148 B1 | 7/2001 | Aggarwal et al. |
| 6,269,369 B1 | 7/2001 | Robertson |
| 6,301,609 B1 | 10/2001 | Aravamudan et al. |
| 6,311,211 B1 | 10/2001 | Shaw |
| 6,314,450 B1 | 11/2001 | Hachiya et al. |
| 6,324,541 B1 | 11/2001 | de l'Etraz et al. |
| 6,330,590 B1 | 12/2001 | Cotten |
| 6,347,332 B1 | 2/2002 | Malet et al. |
| 6,351,698 B1 | 2/2002 | Kubota et al. |
| 6,363,392 B1 | 3/2002 | Halstead et al. |
| 6,374,246 B1 | 4/2002 | Matsuo |
| 6,374,290 B1 | 4/2002 | Scharber et al. |
| 6,389,127 B1 | 5/2002 | Vardi et al. |
| 6,389,372 B1 | 5/2002 | Glance et al. |
| 6,400,381 B1 | 6/2002 | Barrett et al. |
| 6,415,318 B1 | 7/2002 | Aggarwal et al. |
| 6,421,439 B1 | 7/2002 | Liffick |
| 6,421,709 B1 | 7/2002 | McCormick et al. |
| 6,425,012 B1 | 7/2002 | Trovato et al. |
| 6,430,604 B1 | 8/2002 | Ogle et al. |
| 6,446,112 B1 | 9/2002 | Bunney et al. |
| 6,449,344 B1 | 9/2002 | Goldfinger et al. |
| 6,449,634 B1 | 9/2002 | Capiel |
| 6,480,885 B1 | 11/2002 | Olivier |
| 6,484,196 B1 | 11/2002 | Maurille |
| 6,501,834 B1 | 12/2002 | Milewski et al. |
| 6,507,866 B1 | 1/2003 | Barchi |
| 6,525,747 B1 | 2/2003 | Bezos |
| 6,535,586 B1 | 3/2003 | Cloutier et al. |
| 6,539,421 B1 | 3/2003 | Appelman et al. |
| 6,545,660 B1 | 4/2003 | Shen et al. |
| 6,549,937 B1 | 4/2003 | Auerbach et al. |
| 6,557,027 B1 | 4/2003 | Cragun |
| 6,559,863 B1 | 5/2003 | Megiddo |
| 6,571,234 B1 | 5/2003 | Knight et al. |
| 6,580,790 B1 | 6/2003 | Henry et al. |
| 6,606,647 B2 | 8/2003 | Shah et al. |
| 6,615,241 B1 | 9/2003 | Miller et al. |
| 6,636,733 B1 | 10/2003 | Helferich |
| 6,640,230 B1 | 10/2003 | Doss et al. |
| 6,654,683 B2 | 11/2003 | Jin et al. |
| 6,665,173 B2 | 12/2003 | Brandenberg et al. |
| 6,677,968 B1 | 1/2004 | Appelman |
| 6,678,719 B1 | 1/2004 | Stimmel |
| 6,691,162 B1 | 2/2004 | Wick |
| 6,697,807 B2 | 2/2004 | McGeachie |
| 6,701,348 B2 | 3/2004 | Sommerer |
| 6,714,791 B2 | 3/2004 | Friedman |
| 6,714,793 B1 | 3/2004 | Carey et al. |
| 6,731,308 B1 | 5/2004 | Tang et al. |
| 6,732,155 B2 | 5/2004 | Meek |
| 6,750,881 B1 | 6/2004 | Appelman |
| 6,772,188 B1 | 8/2004 | Cloutier |
| 6,781,608 B1 | 8/2004 | Crawford |
| 6,785,554 B1 | 8/2004 | Amerga |
| 6,785,681 B1 | 8/2004 | Keskar et al. |
| 6,788,769 B1 | 9/2004 | Waites |
| 6,799,039 B2 | 9/2004 | Wu et al. |
| 6,800,031 B2 | 10/2004 | Di Cesare |
| 6,834,195 B2 | 12/2004 | Brandenberg et al. |
| 6,839,737 B1 | 1/2005 | Friskel |
| 6,901,559 B1 | 5/2005 | Blum et al. |
| 6,904,026 B1 | 6/2005 | Tarnanen et al. |
| 6,907,243 B1 | 6/2005 | Patel |
| 6,912,563 B1 | 6/2005 | Parker et al. |
| 6,912,564 B1 | 6/2005 | Appelman et al. |
| 6,917,965 B2 | 7/2005 | Gupta et al. |
| 6,941,345 B1 | 9/2005 | Kapil et al. |
| 6,968,179 B1 | 11/2005 | De Vries |
| 6,993,564 B2 | 1/2006 | Whitten, II |
| 7,031,724 B2 | 4/2006 | Ross et al. |
| 7,035,865 B2 | 4/2006 | Doss et al. |
| 7,058,036 B1 | 6/2006 | Yu et al. |
| 7,058,690 B2 | 6/2006 | Maehiro |
| 7,082,047 B2 | 7/2006 | Chow |
| 7,124,123 B1 | 10/2006 | Roskind et al. |
| 7,127,232 B2 | 10/2006 | O'Neil et al. |
| 7,177,880 B2 | 2/2007 | Ruvolo |
| 7,185,059 B2 | 2/2007 | Daniell et al. |
| 7,190,956 B2 | 3/2007 | Dorenbosch et al. |
| 7,200,634 B2 | 4/2007 | Mendiola et al. |
| 7,202,814 B2 | 4/2007 | Caspi et al. |
| 7,219,303 B2 | 5/2007 | Fish |
| 7,222,156 B2 | 5/2007 | Gupta et al. |
| 7,257,570 B2 | 8/2007 | Riise et al. |
| 7,271,742 B2 | 9/2007 | Sheha et al. |
| 7,275,215 B2 | 9/2007 | Werndorfer et al. |
| 7,313,760 B2 | 12/2007 | Grossman et al. |
| 7,436,780 B2 | 10/2008 | Stephens et al. |
| 2001/0005861 A1 | 6/2001 | Mousseau et al. |
| 2001/0013050 A1 | 8/2001 | Shah |
| 2002/0015061 A1 | 2/2002 | Maguire |
| 2002/0021307 A1 | 2/2002 | Glenn et al. |
| 2002/0023132 A1 | 2/2002 | Tornabene et al. |
| 2002/0023134 A1 | 2/2002 | Roskowski et al. |
| 2002/0028595 A1 | 3/2002 | Higashi et al. |
| 2002/0042816 A1 | 4/2002 | Bae |
| 2002/0065856 A1 | 5/2002 | Kisiel |
| 2002/0065894 A1 | 5/2002 | Dalal et al. |
| 2002/0077080 A1 | 6/2002 | Greene |
| 2002/0083136 A1 | 6/2002 | Whitten, II |
| 2002/0091667 A1 | 7/2002 | Jaipuria et al. |
| 2002/0095465 A1 | 7/2002 | Banks et al. |
| 2002/0103801 A1 | 8/2002 | Lysons |
| 2002/0112181 A1 | 8/2002 | Smith |
| 2002/0116463 A1 | 8/2002 | Hart |
| 2002/0116641 A1 | 8/2002 | Mastrianni |
| 2002/0133292 A1 | 9/2002 | Miyaki |
| 2002/0133369 A1 | 9/2002 | Johnson |
| 2002/0147777 A1 | 10/2002 | Hackbarth et al. |
| 2002/0174010 A1 | 11/2002 | Rice, III |
| 2002/0175953 A1 | 11/2002 | Lin |
| 2002/0181703 A1 | 12/2002 | Logan et al. |
| 2002/0184089 A1 | 12/2002 | Tsou et al. |
| 2002/0193942 A1 | 12/2002 | Odakura et al. |
| 2002/0199095 A1 | 12/2002 | Bandini et al. |
| 2003/0004743 A1 | 1/2003 | Callegari |
| 2003/0004855 A1 | 1/2003 | Dutta et al. |
| 2003/0004872 A1 | 1/2003 | Gardi et al. |
| 2003/0009523 A1 | 1/2003 | Lindskog et al. |
| 2003/0018726 A1 | 1/2003 | Low et al. |
| 2003/0023875 A1 | 1/2003 | Hursey et al. |
| 2003/0028524 A1 | 2/2003 | Keskar et al. |
| 2003/0028595 A1 | 2/2003 | Vogt et al. |

| | | | |
|---|---|---|---|
| 2003/0037112 A1 | 2/2003 | Fitzpatrick | |
| 2003/0043201 A1 | 3/2003 | Abdelhadi et al. | |
| 2003/0046198 A1 | 3/2003 | Knapp et al. | |
| 2003/0050916 A1 | 3/2003 | Ortega et al. | |
| 2003/0084103 A1 | 5/2003 | Weiner et al. | |
| 2003/0093580 A1 | 5/2003 | Thomas et al. | |
| 2003/0105822 A1 | 6/2003 | Gusler et al. | |
| 2003/0131061 A1 | 7/2003 | Newton et al. | |
| 2003/0140103 A1 | 7/2003 | Szeto et al. | |
| 2003/0167324 A1 | 9/2003 | Farnham et al. | |
| 2003/0182394 A1 | 9/2003 | Ryngler et al. | |
| 2003/0187813 A1 | 10/2003 | Goldman et al. | |
| 2004/0015548 A1 | 1/2004 | Lee | |
| 2004/0036649 A1 | 2/2004 | Taylor et al. | |
| 2004/0054729 A1 | 3/2004 | Fukuizumi et al. | |
| 2004/0056901 A1 | 3/2004 | March et al. | |
| 2004/0117443 A1 | 6/2004 | Barsness | |
| 2004/0122681 A1 | 6/2004 | Ruvolo | |
| 2004/0122810 A1 | 6/2004 | Mayer | |
| 2004/0122855 A1 | 6/2004 | Ruvolo | |
| 2004/0128356 A1 | 7/2004 | Bernstein et al. | |
| 2004/0179039 A1 | 9/2004 | Blattner et al. | |
| 2004/0186738 A1 | 9/2004 | Reisman | |
| 2004/0210844 A1 | 10/2004 | Pettinati et al. | |
| 2004/0215648 A1 | 10/2004 | Marshall | |
| 2004/0215721 A1 | 10/2004 | Szeto et al. | |
| 2004/0243941 A1 | 12/2004 | Fish | |
| 2004/0260762 A1 | 12/2004 | Fish | |
| 2005/0015432 A1 | 1/2005 | Cohen | |
| 2005/0021750 A1 | 1/2005 | Abrams | |
| 2005/0027382 A1 | 2/2005 | Kirmse et al. | |
| 2005/0038856 A1 | 2/2005 | Krishnasamy et al. | |
| 2005/0043989 A1 | 2/2005 | Shifrin | |
| 2005/0044152 A1 | 2/2005 | Hardy et al. | |
| 2005/0050143 A1 | 3/2005 | Gusler et al. | |
| 2005/0060377 A1 | 3/2005 | Lo et al. | |
| 2005/0076241 A1 | 4/2005 | Appelman | |
| 2005/0080863 A1 | 4/2005 | Daniell | |
| 2005/0086211 A1 | 4/2005 | Mayer | |
| 2005/0102202 A1 | 5/2005 | Linden et al. | |
| 2005/0113123 A1* | 5/2005 | Torvinen | 455/519 |
| 2005/0114229 A1 | 5/2005 | Ackley et al. | |
| 2005/0153681 A1 | 7/2005 | Hanson | |
| 2005/0166154 A1 | 7/2005 | Wilson et al. | |
| 2005/0197846 A1 | 9/2005 | Pezaris | |
| 2006/0005133 A1 | 1/2006 | Lyle et al. | |
| 2006/0046743 A1 | 3/2006 | Mirho | |
| 2006/0052091 A1 | 3/2006 | Onyon et al. | |
| 2006/0075044 A1 | 4/2006 | Fox et al. | |
| 2006/0167991 A1 | 7/2006 | Heikes et al. | |
| 2006/0168054 A1 | 7/2006 | Burkhart et al. | |
| 2006/0173824 A1 | 8/2006 | Bensky et al. | |
| 2006/0173963 A1 | 8/2006 | Roseway et al. | |
| 2006/0173985 A1 | 8/2006 | Moore | |
| 2006/0182248 A1 | 8/2006 | Smith et al. | |
| 2006/0212561 A1 | 9/2006 | Feng | |
| 2006/0256816 A1 | 11/2006 | Yarlagadda et al. | |
| 2006/0258368 A1 | 11/2006 | Granito et al. | |
| 2006/0259474 A1 | 11/2006 | Granito | |
| 2006/0277187 A1 | 12/2006 | Roese et al. | |
| 2007/0032225 A1 | 2/2007 | Konicek et al. | |
| 2007/0043828 A1 | 2/2007 | Famolari et al. | |
| 2007/0053335 A1 | 3/2007 | Onyon et al. | |
| 2007/0085739 A1 | 4/2007 | Udall | |
| 2007/0149214 A1 | 6/2007 | Walsh et al. | |
| 2007/0156664 A1 | 7/2007 | Norton et al. | |
| 2007/0161382 A1* | 7/2007 | Melinger et al. | 455/456.1 |
| 2007/0210937 A1 | 9/2007 | Smith et al. | |
| 2007/0243880 A1 | 10/2007 | Gits et al. | |
| 2007/0288852 A1 | 12/2007 | Fish | |
| 2009/0029691 A1* | 1/2009 | Shen et al. | 455/418 |
| 2009/0089316 A1 | 4/2009 | Kogan et al. | |

FOREIGN PATENT DOCUMENTS

| | | |
|---|---|---|
| GB | 2357932 | 7/2001 |
| GB | 2368747 | 5/2002 |
| JP | 2000-049901 | 2/2000 |
| JP | 2000-259514 | 9/2000 |
| JP | 2000-284999 | 10/2000 |
| JP | 2001-084320 | 3/2001 |
| WO | WO 97/10558 | 3/1997 |
| WO | WO 97/46955 | 12/1997 |
| WO | WO 98/16045 | 4/1998 |
| WO | WO 98/47270 | 10/1998 |
| WO | WO 99/08434 | 2/1999 |
| WO | WO 99/34628 | 7/1999 |
| WO | WO 99/48011 | 9/1999 |
| WO | WO 00/79396 | 12/2000 |
| WO | WO 01/06748 | 1/2001 |
| WO | WO 01/22258 | 3/2001 |
| WO | WO 01/24036 | 4/2001 |
| WO | WO 01/43357 | 6/2001 |
| WO | WO 01/67787 | 9/2001 |
| WO | WO 01/80079 | 10/2001 |
| WO | WO 02/03216 | 1/2002 |
| WO | WO 02/35781 | 5/2002 |
| WO | WO 02/062039 A2 | 8/2002 |
| WO | WO 02/073886 | 9/2002 |
| WO | WO 2004/028178 A2 | 4/2004 |
| WO | WO 2005/086723 | 9/2005 |
| WO | WO 2007/061869 A1 | 5/2007 |

OTHER PUBLICATIONS

Office Action, U.S. Appl. No. 11/238,110, dated Nov. 29,2007, 11 pages.

International Search Report, Application Serial No. PCT/US2006/018286, dated Oct. 19, 2006, 12 pages.

BuddyGopher~About, available on Jul. 13, 2004, reprinted from http://web.archive.org/web/20040713002836/www.buddygopher.com/about.html on Sep. 28, 2005 (4 pgs).

BuddyGopher~We Love Away Messages!, "BuddyGopher simultaneously checks the away messages of your favorite AIM® buddies.", available on Sep. 24, 2004, reprinted from http://web.archive.org/web/20040924104001/http://www.buddygopher.com/ on Sep. 28, 2005 (2 pgs).

Dodgeball.com:: mobile social software, "Hook up with friends. Discover what's around you.", available on Nov. 30, 2003, reprinted from http://web.archive.org/web/20041130034344/www.dodgeball.com/social/index.php on Sep. 28, 2005 (2 pgs).

Dodgeball.com:: mobile social software, "help: the basics", available on Oct. 9, 2004, reprinted from http://web.archive.org/web/20041009200739/www.dodgeball.com/social/help_basics.php on Sep. 28, 2005 (2 pgs).

Dodgeball.com:: mobile social software, "help: text messaging", available on Oct. 13, 2004, reprinted from http://web.archive.org/web/20041013034241/www.dodgeball.com/social/help_text.php on Sep. 28, 2005 (3 pgs).

Dodgeball.com:: mobile social software, "help: use it", available on Oct. 9, 2004, reprinted from http://web.archive.org/web/20041009201853/www.dodgeball.com/social/help_useit.php on Sep. 28, 2005 (2 pgs).

Office Action, U.S. Appl. No. 11/238,129, dated May 28,2008, 70 pages.

U.S. Appl. No. 11/238,130, filed Sep. 29, 2005, 39 pages.

Menkens et al., "IMS Social Network Application With J2ME Compatible Push-to-Talk Service," The International Conference on Next Generation Mobile Applications, Services and Technologies, Sep. 12-14, 2007, pp. 70-75.

Multi-User Dungeon ("MUD"), <http://en.wikipedia.org/wiki/MUD>, downloaded on Mar. 23, 2009 (9 pages).

Flicker Geotagging, <http://www.helio.com/mobile-features/mobile-gps-navigation/flickr-geotagging>, downloaded on Mar. 30, 2009 (1 page).

Mobile Location-Based Services—4$^{th}$ Edition, Table of Contents (2009), http://www.reportlinker.com/p0126704/Reportlinker-Adds-Mobile-Location-Based-Services—4th-Edition.html (5 pages).

"About Internet directory services," Outlook 2000 SR-1 (9.0.0.4527) Help File, on or before Aug. 10, 2001, p. 1.

"Active Directory Features." [online]. Jun. 15, 1999 [retrieved on May 13, 2003]. Retrieved from the Internet : <http://www.microsoft.com/windows2000/server/evaluation/features/adlist.asp>, pp. 1-4.

"Active Directory Service Overview," [online], Nov. 30, 2001 [retrieved on May 13, 2003]. Retrieved from the Internet <http://www.microsoft.com/windows2000/server/evaluation/business/ad-datasheet.asp>, pp. 1-5.

"Active Directory," [online], [retrieved on May 13, 2003]. Retrieved from the Internet <http://www.microsoft.com/windows2000/technologies/direct/AD/default.asp>, pp. 1-13.

"Benefits of Active Directory in a Windows 2000 Environment," [online]. Sep. 20, 2001 [retrieved on May 13, 2003]. Retrieved from the Internet <http://www.mIcrosoft.comJwIndows2000/server/evaluatIonJbusiness/adwin2k.asp>, pp. 1-9.

"Directory Integration Can Lower-Total Cost of Ownership and Increase Application Functionality," [online], Jul. 27, 1998 [retrieved on May 13, 2003]. Retrieved from the Internet <http://www.microsoft.com/presspass/press/1998/Jul98/ActivDPR.asp>, pp. 1-4.

"Enterprise Identity Management with Windows 2000 and Active Directory," [online], 1999 [retrieved on May 13, 2003]. Retrieved from the Internet <http://www.microsoft.com/technet/prodtechnol/ad/windows2000/evaluate/w2keims,asp?fra . . . >, pp. 1-16.

"Integrated Applications with Windows 2000 and Active Directory," [online], Oct. 2000 [retrieved on May 8, 2003]. Retrieved from the Internet <http://www.microsoft.com/technet/prodtechnol/ad/windows2000/evaluate/adappstr.asp?fra . . . >, pp. 1-12.

"Integrated Microsoft Metadirectory Services and Active Directory," [online], Aug. 31, 2000 [retrieved on May 13, 2003]. Retrieved from the Internet <http://www.microsoft.com/windows2000/server/evaluation/news/bulletins/mmsma.asp>, 1 page.

"Look up contact information from an item," Outlook-2000 SR-1 (9.0.0. 4527) Help File, on or before Aug. 10, 2001, 1 page.

"Set up LDAP directory services," Outlook 2000 SR-1 (9.0.0. 4527) Help File, on or before Aug. 10, 2001, 1 page.

"What new about exchanging information over the Internet," Outlook 2000 SR-1, (9.0.0. 4527) Help File, on or before Aug. 10, 2001, 1 page.

"Windows 2000 Directory Services," [online], [retrieved on May 13, 2003]. Retrieved from the Internet <http://microsoft.com/windows2000/technologies/directory.asp>, pp. 1-2.

"A Countermeasure to Duplicate-detecting-Anti-spam Techniques," Robert J. Hall, AT&T Labs Technical Report Report 99.9.1, 1999, Abstract and pp. 1-26.

"A Reputation System for Peer-to-Peer Networks," Gupta et al., Jun. 1-3, 2003, NOSSDAV'03, Monterey, California, pp. 144-152.

"Announce: Implementation of E-mail Spam Proposal," Maurice L. Marvin, news.admin.net-abuse.misc. Aug 3, 1996, 2 pages.

"AOL Instant Messenger Windows Beta Features," Jun. 24, 1999, 2 pages.

"AOL Instant Messenger All New Version 2.0" Jun. 24, 1999, 2 pages.

"What is AOL Instant Messenger," Jun. 24, 1999, 3 pages.

"Quick Tips for Getting Started," Jun. 24, 1999, 5 pages.

"Frequently Asked Questions About AOL Instant Messenger,"Jun. 24, 1999, 6 pages.

"AOL technology: turning complicated things into engaging services," 1996 Annual Report, 22 pages.

"BestCalls.com Announces the BestCalls Technology Index," Business Wire, Jun. 30, 1999, Business Wire, 1 page.

"Better Bayesian Filtering," Paul Graham, Jan. 2003, pp. 1-11, http://www.paulgraham.com/better.html.

"Business at Cyberspeed: Brainstorm Becomes Quick Internet Hit," Walker, Jan. 24, 1999, The Washington Post, p. A.01 (4 total pages).

"CrushParty.com: Help," retrieved Jun. 12, 2002 from the World Wide Web: http://www.crushparty.com/help.jsp, 3 pages.

"Degrees of Separation Email Spam Protection," Halfbakery: Degrees of Separation Email Spam Protection, reprinted from http://halfbakery.com/idea/Degrees_20of_20Separation_20Email_20Spam_20Protecti . . . printed on Mar. 1, 2004 (3 pages).

"Digital Artifacts for Remembering and Storytelling: Post History and Social Network Fragments," Viegas et al., retrieved from the World Wide Web: http://we.media.mit.edu/-fviegas/papers/posthistory_snf.pdf, 10 pages.

"Finding Others Online: Reputation Systems for Social Online Spaces," Jensen et al., Apr. 20-25, 2002, CHI, Minneapolis, Minnesota, vol. 4, Issue 1, pp. 447-454.

"Frequently Asked Questions About AOL Instant Messenger", 6 pages, Jun. 24, 1999.

"Hottie or Nottie? Web Site Voters Let You Know Whether You Sizzle or Fizzle," Marino, Jul. 11, 2001, Florida Times Union, p. C.1 (2 total pages).

"Icq anywhere, E-mail Features—Email Center—ICQ.com," retrieved Apr. 29. 2004 from the World Wide Web: http://www.icq.com/email/popular-features.html, pp. 1-5.

"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnl+0&adxnnlx=107029 . . . , printed on Nov. 5, 2004 (3 pages).

"Instant Messaging for Gamers," PC Gamer, May 2004, vol. 11, No. 5, p. 28.

"Learning Spam: Simple Techniques for Freely-Available Software," Bart Massey et al. Computer Science Dept, Portland, OR USA, 2003, pp. 1-14.

"Learning to Filter Spam E-Mail: A Comparison of a Naïve Bayesian and a Memory-Based Approach," Ion Adroutsopoulos et al., University of Athens. Sep. 2000, pp. 1-12.

"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.

"PieSpy—Inferring and Visualizing Social Network on IRC," PieSpy Social Network Bot, reprinted from http://lister.linux-srv.anix.net/piespy printed on Mar. 11, 2004 (8 pages).

"plaxo," Plaxo, reprinted from http://web.archive.org/web/20041105072256/http://www.plaxo.com/ printed on Nov. 5, 2004 (available on Feb. 14, 2004) (2 pages).

"Plaxo-Update Your Address Book," Plaxo Contact Networks, reprinted from http://web.archive.org/web/20030218233638/http://www.plaxo.com/printed on Nov. 5, 2004 (available on Feb. 18, 2003) (1 page).

"Reflections on Friendster, Trust and Intimacy," Danah Boyd. *Ubicomp 2003*, Workshop Application for the Intimate Ubiquitous Computing Workshop. Seattle, WA, Oct. 12-15, 2003.

"RIM Road: Software: Internet & Network: Webmessenger RIM J2ME/Instant Messaging," retrieved Apr. 29, 2004 from the World Wide Web: http://www.rimrod.com/software/rim1/Webmessenger-RIM-J2ME-Instant-Messaging-20 . . . , pp. 1-4.

"Six Degrees—New Programs Help Companies 'Mine Workers' Relationships for Key Business Prospects," William M. Bulkeley et al., Marketplace, The Wall Street Journal, Aug. 4, 2003, (3 pages).

"Social Nets Find Friends in VCs," Joanna Glasner, http://www.wired.com/news, Nov. 17, 2003, pp. 1-3.

"Social Network Fragments: An Interactive Tool for Exploring Digital Social Connections," Danah Boyd, Jeff Potter. Sketch at *SIGGRAPH 2003*. San Diego, California: ACM, Jul. 27-31, 2003.

"Social Networking for Business: Release 0.5," Esther Dyson, Esther Dyson's Monthly Report, vol. 21, No. 10, Nov. 25, 2003, www.edventure.com, (36 pages).

"Social Sites Clicking With Investors," Washingtonpost.com: Social Sites Clicking With investors, reprinted from http://www.washingtonpost.com/ac2/wp-dyn/A32066-2003Nov12?language=printer printed on Nov. 5, 2004.

"Social Social Networks: Deodorant for the Soul?," Esther Dyson, Esther Dyson's Monthly Report, vol. 21, No. 11, Dec. 12, 2003, www.edventure.com, (36 pages).

"Socialware: Multiagent Systems for Supporting Network Communities,"Hattori et al., Mar. 1999, Association for Computing Machinery. Communications of the ACM. vol. 42, Issue 3, pp. 55-61, text version.

"Spoke Builds on Social Networking Patent Portfolio," Spoke Builds on Social Networking Patent Protfolio, reprinted from http://www.internetnews.com/ent-news/print.php/3073621 printed on Nov. 5, 2004 (3 pages).

"Support Vector Machines for Spam Categorization," Harris Drucker et al., IEEE Transactions on Neural Networks, vol. 10. No. 5, Sep. 1999, pp. 1048-1054.

"Support Vector Machines," Marti Hearst, IEEE Intelligent Systems, Jul./Aug. 1998, pp, 18-28.

SVM-based Filtering of E-mail Spam with Content-specific Misclassification Costs: Aleksander Kolcz et al., *TextDM'2001* (*IEEE ICDM-2001 Workshop on Text Mining*), San Jose, CA, 2001, pp. 1-14.

"SWF Seeks Attractive Head Shot; To Stand Out, Online caters Pay for Professional Photos; Cropping out the Ex-Wife," Leiber, Nov. 19, 2003, The Wall Street Journal, p. D.1.

"Technical Solutions for Controlling Spam," Shane Hird, Proceedings of AUUG2002, Melbourne, Sep. 4-6, 2002, 17 pages.

"Technology Journal—Are You Satisfied? EBay's Battle Against Fraud Rests Primarily on a Simple Concept: Customer Feedback," Wingfield, Sep. 23, 2002. Asian Wall Street Journal, p. T.8 (4 total pages).

"Technology Journal: Changing Chat—Instant Messaging is Taking Off, and for Some Users It's Nuzzling Out the Phone," Nick Waingfield, Asian WSJ, Sep. 2000.

"Telstra targets Net spammers." J. Dudley, news.com.au, Dec. 2, 2003, 2 pages.

"Text Categorization with Support Vector Machines: Learning with Many Relevant Features," Thorsten Joachims, University of Dortmund, Computer Science Dept., LS-8 Report 23, 1998, 18 pages.

"The first Social Software . . . a true Social Adventure," Huminity-Social Networking, Chat Software, Create Personal Free Blogs and My Group . . . , reprinted from http://www.huminity.com/printed on Nov. 5, 2004 (2 pages).

"The LP Wireless Messenger," Messenger Documentation, [online]. LP Wireless, Inc., 2001 [retrieved on Nov. 2, 2002]. Retrieved from the Internet, http://lpwireless.com/messengerhelp.htm>, pp. 1-7.

"Trillian Discussion Forums—HOWTO: Import ICQ 2003a Contact list," retrieved Apr. 29, 2004 from the World Wide Web: http://trillian.cc/forums/showthread.php?s+threadid=36475, pp. 1-2.

"Using Active Directory Service," from Chapter 5, *Microsoft Windows 2000 Administrator's Pocket Consultant*, by William R. Shank (1999). Retrieved from http://www.microsoft.com/technet/prodtechnol/ad/windows2000/evaluate/05w2kadb.asp?fr . . . pp. 1-6.

"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).

"Will You Buy a Car From This Man?," Leander Kahney, Oct. 6, 2003, pp. 1-3.

"Working with Active Directory Domains," from Chapter 5, *Microsoft Windows 2000 Administrator's Pocket Consultant*, by William R. Stank (1999). Retrieved from http://www.microsoft.com/technet/prodtechnol/ad/windows2000/evaluate/05w2kadb.asp?fr . . . , pp. 1-10.

"Yahoo! Messenger Makes the World a Little Smaller, More Informed," pp. 1-2, Jun. 21, 1999.

Alan Cohen, "Instant Messaging," Apr. 13, 1999, PC Magazine, PC Labs, 2 pages.

America Online Inc., "AOL Instant Messenger," Aug. 29, 2000, Internet: www.aol.com/aim/.

America Online Inc., New AIM 4.7, Sep. 27, 2001, Internet: http://aim.aol.com.

CNET Networks Inc., "PopUp Killer," Sep. 13, 2001, Internet: download.cnet.com/downloads/0-10059-100-6932612.html.

International Search Report for International Application No. PCT/US03/15715, mailed Aug. 14, 2003.

International Search Report for European Application No. EP03731244, mailed Aug. 30, 2005.

Supplementary European Search Report for European Application No. EP05728303, mailed Jan. 9, 2009 (2 pages).

Ed Bott and Ron Person, Using Windows 95 with Internet Explorer 4.0, Feb. 17, 1998, Que, Special Edition.

Eschenburg, Wo laufen sie denn?, Oct. 26, 1998, pp. 92-95.

Home-tribe.net, http://washingtondc.tribe.net/message/24434d1b-817b-4580-aa42-3bffa15f26a?page=1 (4 pages).

http://www.friendster.com (17 pages).

International Search Report, Application Serial No. PCT/US05/45663, dated Apr. 11, 2008, 10 pages.

J.C. Cannon, "Design Guide for Directory-Enabled Applications," [online]. Apr. 2001 [retrieved on May 13, 2003]. Retrieved from the Internet <http://msdn.microsoft.com/library/en-us/dnactdir/html/deal.asp?frame=true>, pp. 1-18.

Kohda et al., IMPP: A new Instant Messaging Standard and Its Impact on Internet Business, Dec. 2000, Fujitsu Sci., Tech. J., 36, 2 pp. 147-153.

Mckendrick, Joseph, "Internet Call Centers: New Era in Customer Service," Feb. 2002; V10, n2, pp. 22-25.

Microsoft Corporation, "Active Directory Services Interface in the Microsoft Exchange 5.5 Environment," [online], Nov. 1997 [retrieved on May 13, 2003]. Retrieved from the Internet <http://msdn.microsoft.com/library/en-us/dnactdir/html/msdn_adsiexch.asp?frame=true>, pp. 1-11.

Microsoft Corporation, "Comparing Microsoft Active Directory to Novell's NDS," [online], Sep. 1998 [retrieved on May 13, 2003]. Retrieved from the Internet <http://msdn.microsoft.com/library/en-us/dnactdir/html/msdn_activedirvsnds.asp?frame=true>, pp. 1-17.

Microsoft Corporation, "Introduction to Active Directory Application Mode," Microsoft Windows Server 2003, Aug. 2002, pp. 1-13.

Microsoft Corporation, "Using ADSI, LDAP, and Network Management Functions With Active Directory," [online], Feb. 2002 [retrieved on May 13, 2003]. Retrieved from the Internet <http://msdn.microsoft.com/library/en-us/dnactdir/html/BuildingADApps.asp?frame=true>, pp. 1-9.

Mutton, Paul, "PieSpy Social Network Bot Inferring and Visualizing Social Networks IRC," Dec. 4, 2003, Internet Archive Wayback Machine http://web.archibe.org/web/20031204185952/http://jibble.org/piespy, 17 pages.

Neo Mal, Ken Neo, "Buying and selling on the Internet; [Computimes, 2 Edition]." New Straits Times. Kuala Lumpur: Jun. 28, 2001, p. 53.

Notice from the European Patent Office dated Oct. 1, 2007 concerning business methods—Journal of the European Patent Office, vol. 30, No. 11 (Jan. 11, 2007) pp. 592-593, XP007905525 ISSN: 0170-9291.

R. Movva & W. Lai, "MSN Messenger Service 1.0 Protocol," Aug. 1999, Internet Draft, http://tools.ietf.org/id/draft-movva-msn-messenger-protocol-oo.txt, 28 pages.

Reichard. K., "AOL, ICQ to Interoperate—But in a Limited Fashion," Oct. 30, 2002, InstantMessagingPlanet, available at www.instantmessagingplanet.com/public/article.php/1490771.

Ryze home page, www.ryze.com, Dec. 21, 2003, available at http://web.archive.org/web/20031221010006/http://ryze.com, printed Mar. 16, 2005, 13 pages.

Visiblepath webpages, www.visiblepath.org, Dec. 3, 2003, available at http://web.archive.org/web/20031203132211/http://www.visiblepath.com, Mar. 16, 2005, 5 pages.

WebmasterWorld.com Inc., "HTML and Browsers," Mar. 5, 2001, Internet: www.webmaster.com/forum21/367.htm.

ZeroDegrees home page, www.zerodegrees.com, Jan. 24, 2004, available at http://web.archive.org/web/20040204153037/www.zerodegrees.com/home.htm, printed Mar. 6, 2005, 2 pages.

Takashi Yoshino et al., "Namba: Location-Aware Collaboration System for Shopping and Meeting", Aug. 2002, IEEE Transactins on Consumer Electronics, pp. 470-477.

Anand Ranganathan et al., "ConChat: A Context-Aware Chat Program", 2002, Pervasive Computing, pp. 51-57.

Mary Beth Marklein, "Students have 'away' with words", Mar. 28, 2004, USA Today, "http://www.usatoday.com/tech/news/2004-03-28-away-messages-usat_x.htm", all pages.

International Search Report and Written Opinion dated Feb. 15, 2006, for International Application No. PCT/US05/07204.

Examiner's Answer in response to Appeal Brief of U.S. Appl. No. 11/238,129, mailed Jan. 14, 2009, 85 pages.

Office Action of U.S. Appl. No. 11/237,718, mailed Apr. 2, 2009, 53 pages.

Office Action of U.S. Appl. No. 11/237,718, mailed Oct. 30, 2009, 32 pages.

Notice of Allowance of U.S. Appl. No. 11/237,718, mailed Apr. 2, 2010, 6 pages.

Office Action of U.S. Appl. No. 11/238,110, mailed Nov. 29, 2007, 11 pages.

Office Action of U.S. Appl. No. 11/238,110, mailed Jul. 9, 2008, 11 pages.
Office Action of U.S. Appl. No. 11/238,110, mailed Oct. 9, 2008, 12 pages.
Notice of Allowance of U.S. Appl. No. 11/238,110, mailed Feb. 25, 2009, 7 pages.
Notice of Allowance of U.S. Appl. No. 11/238,110, mailed Jun. 15, 2009, 22 pages.
Supplemental Notice of Allowability of U.S. Appl. No. 11/238,110, mailed Jul. 2, 2009, 17 pages.
Office Action of U.S. Appl. No. 11/238,129, mailed Nov. 14, 2007, 35 pages.
Office Action of U.S. Appl. No. 11/238,129, mailed May 28, 2008, 70 pages.
Notice of Allowance of U.S. Appl. No. 11/238,129, mailed Jun. 4, 2010, 4 pages.
Office Action of U.S. Appl. No. 11/238,130, mailed Jul. 3, 2008, 24 pages.
Office Action of U.S. Appl. No. 11/238,130, mailed Nov. 13, 2008, 44 pages.
Office Action of U.S. Appl. No. 11/238,130, mailed Apr. 14, 2009, 35 pages.
Office Action of U.S. Appl. No. 11/238,130, mailed Nov. 24, 2009, 41 pages.
Notice of Allowance of U.S. Appl. No. 11/238,130, mailed Mar. 15, 2010, 6 pages.
Notice of Allowance of U.S. Appl. No. 12/581,669, mailed Jun. 29, 2010, 22 pages.
Notice of Allowance of U.S. Appl. No. 12/581,669, mailed Oct. 7, 2010, 6 pages.
Office Action of U.S. Appl. No. 12/815,847, mailed Jul. 21, 2011, 16 pages.
Office Action of U.S. Appl. No. 12/815,847, mailed Nov. 9, 2011, 12 pages.
Office Action of U.S. Appl. No. 12/815,847, mailed Apr. 27, 2012, 6 pages.
International Search Report and Written Opinion dated Feb. 4, 2010, for International Application No. PCT/US2009/054886.
Communication from European Patent Office dated Jun. 5, 2012, for Application No. EP 09791884.1, 6 pages.

* cited by examiner

METHODS AND SYSTEM FOR PROVIDING LOCATION-BASED COMMUNICATION SERVICES

BACKGROUND

1. Technical Field

The present invention generally relates to electronic communication networks and services. More particularly, and without limitation, the invention relates to methods and systems for providing communication services based on the location of a user accessing the services.

2. Background Information

People have changed how they access and use communication services due, in large part, to the advances in personal mobile communications and the increasing popularity of social networking. Over the last several decades, mobile phone technology has steadily evolved and is now available in every industrialized country throughout the world. With the rise of the Internet and the World Wide Web (or simply the "Web"), social networking sites have also increased in number and usage, and today are among the most popular sites on the Web.

Modern mobile communication networks offer a variety of devices and services that provide both mobility and easy access to communication services and information. For example, mobile devices, such as smart phones and personal media players, support mobile telephony and Internet access in conjunction with associated application services. Further, a wide range of application services are available to mobile device users, including streaming video, text messaging, instant messaging, and traditional voice services.

Application services for mobile devices, however, are often designed as desktop solutions later modified for use in a mobile environment. Social networking applications, for example, are popular desktop applications. Social networking applications, including Web-based and desktop applications, allow users to create and/or share content reflecting their interests. To aid communication between users, some social networking applications allow users to create their own personal environment or groups. In addition, many social networking applications include tools for creating or sharing content with others that share similar interests or that belong to an individual user's group or personal environment.

Despite these technological advances, there are several drawbacks with existing mobile and social networking applications. For example, application services for mobile devices are often first designed as desktop solutions and not optimized for use in a mobile environment. In addition, features related to mobile communication networks and social networking applications have not been successfully integrated with one another. For instance, in a mobile environment, information associated with a mobile user's location is typically not a component of a social network or integrated with social networking tools. As a result, content accessible using a social networking application may appear undifferentiated to a mobile user as compared to a user accessing a social network or group from a fixed location (e.g., home or office). Moreover, social networking applications lack location-relevant functionality to improve their usefulness for mobile users.

As a result of these and other drawbacks, there is a need for improved systems and methods for integrating mobile and social networking environments. For example, there is a need for systems and methods that provide or restrict social networking or other content to a mobile user depending on their current location. There is also a need for systems and methods with location-relevant functionality, so that communication services may be offered to mobile users depending on their location.

SUMMARY

Consistent with embodiments of the present invention, there is provided a method for providing electronic communication between a user and a group of users based on a predetermined proximity to a point of interest, that includes, detecting when a current location of a mobile device of the user is within the predetermined proximity to the point of interest, providing, to the mobile device of the user, a notification to join the electronic communication with the group of users when the current location of the mobile device is detected to be within the predetermined proximity to the point of interest, and in response to an acceptance from the user, establishing electronic communication between the user and the group of users. In some embodiments, the electronic communication may include at least one of a chat session, text messaging, and instant messaging. In some embodiments, the predetermined proximity to the point of interest may include a predefined distance from at least one of a landmark, an event, and a current location of another user. In some embodiments, the predetermined proximity to the point of interest may be defined by a member of the group of users. In some embodiments, establishing electronic communication may include transmitting, from the mobile device, an anonymous call-sign prior to joining the electronic communication with the group of users. In other embodiments, the method may include denying access to electronic communication with the group of users when the user fails to provide proper identification.

Consistent with embodiments of the present invention, there is also provided a method for providing a location-based chat session, that includes, receiving, at a host server, a chat session initialization request, the chat session initialization request comprising a predetermined geographic region associated with a chat session, determining a location of a mobile device relative to the predetermined geographic region, transferring, to the mobile device, a chat session notification based on a determination that the location of the mobile device is within the predetermined geographic region, receiving, at the host server, a request to join the chat session in response to receipt of the chat session notification, and granting the mobile device access to the chat session in response to the request to join the chat session.

Consistent with embodiments of the present invention, there is also provided a method for electronically providing a data feed based on a location of a user, that includes, determining a current location of a mobile device of the user, providing, when the mobile device is determined to be within a predetermined geographic region defined by a user's group member, a notification to the user of an availability of a data feed associated with at least one point of interest in the predetermined geographic region, and transferring, to the mobile device, the data feed in response to an acceptance of the notification by the user. In some embodiments, the notification may include at least one of a visual indicator, an audible indicator, and an electronic message. In some embodiments, the data feed may include one of an image, a video data stream, an audio data stream, a text message, an email, and a chat session notification. In some embodiments, the predetermined geographic region may be defined based on a proximity to the at least one point of interest. In other embodiments, the at least one point of interest may include at least one of a landmark, an event, or a geographic location.

Consistent with embodiments of the present invention, there is also provided a method for providing a location-based data feed, that includes, receiving, at a host server, data uploaded from a first device, wherein the data uploaded from the first device is associated with a location defined by a user's group member, determining whether a second device is within a predetermined geographic region associated with the location, and transferring, from the host server, the data uploaded from the first device to the second device based on a determination that that the second device is within the predetermined geographic region.

Consistent with embodiments of the present invention, there is also provided a system for accessing a location-based data feed, that includes a processor configured to execute instructions for performing a method, that includes, determining a current location of a mobile device of a user, receiving, when the mobile device is determined to be within a predetermined geographic region defined by a user's group member, a notification to the user of an availability of a data feed associated with at least one point of interest in the predetermined geographic region, and transferring, to the mobile device, the data feed in response to an acceptance of the notification by the user.

Embodiments of the present invention also relate to instructions created, stored, accessed, or modified by processors using computer-readable storage media and/or computer-readable memory.

It is to be understood that both the foregoing general description and the following detailed description are exemplary and explanatory only and are not restrictive of the invention. Further embodiments and aspects of the invention are described with reference to the accompanying drawings, which are incorporated in and constitute a part of this specification.

These and other embodiments are further explained below with respect to the following figures.

BRIEF DESCRIPTION OF THE DRAWINGS

The following figures are described in the detailed description below.

DETAILED DESCRIPTION

Reference will now be made in detail to one or more exemplary embodiments of the present invention as illustrated in the accompanying drawings to refer to the same or like parts.

Figure 1:
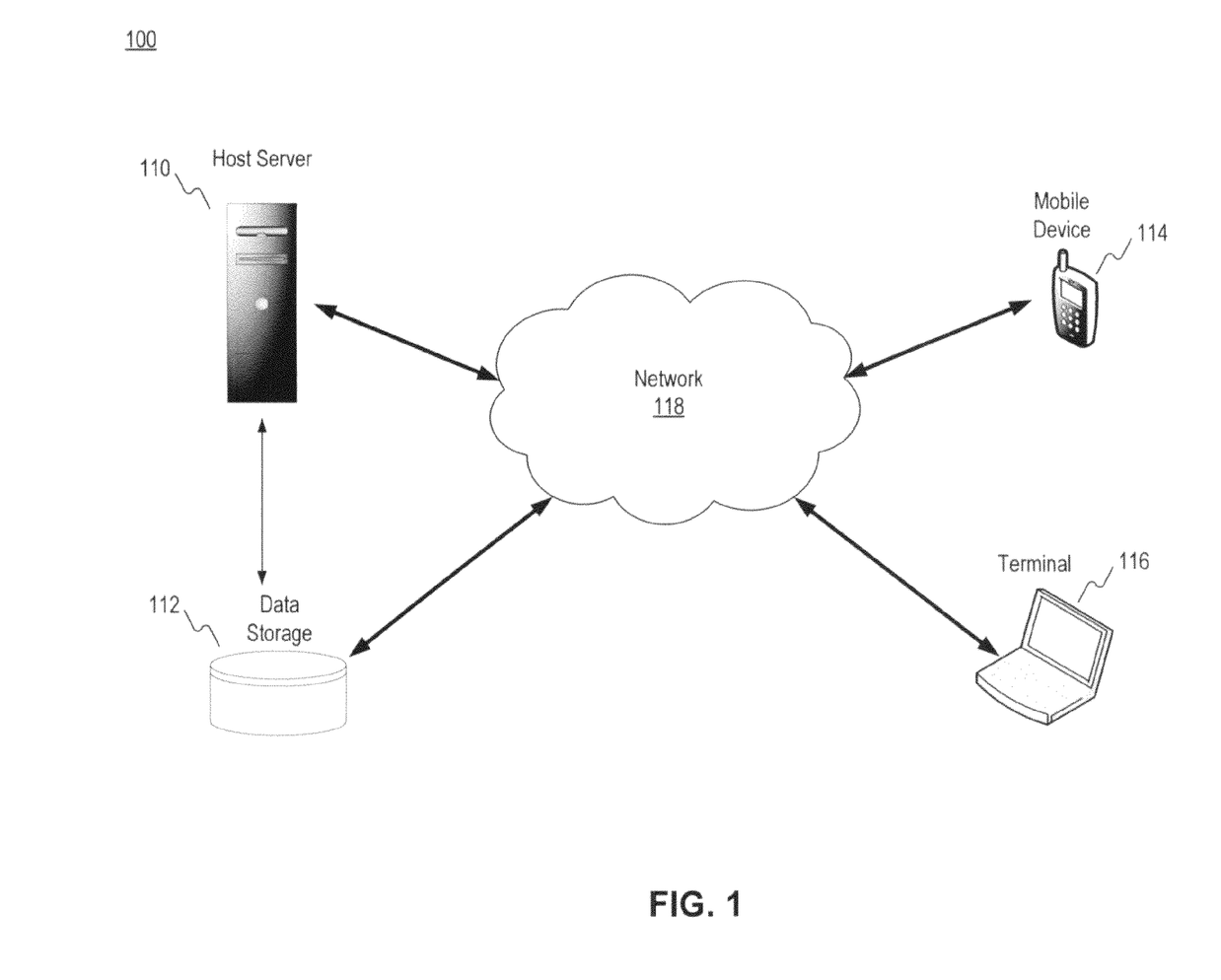
FIG. 1 is a diagram illustrating components of an exemplary system environment for implementing embodiments of the present invention.

FIG. 1 is a diagram illustrating components of an exemplary system 100 for implementing embodiments consistent with the present invention. By way of example, system 100 may be implemented to provide location-based communication services, such as location-based chat sessions or location-based data feeds. As further disclosed herein, a mobile user may be notified of a chat session or data feed upon approaching a geographic area or a point of interest. The information or content shared via the chat session or data feed may relate to any subject and may be specific to a point of interest or geographic location. Access to a chat session may be unlimited or limited to a user or a group of users associated with a social network. In one embodiment, a location-based feed is made available to any user within a predetermined geographic area.

As shown in the example of FIG. 1, system 100 comprises host server 110, data storage 112, mobile device 114, and terminal 116. To facilitate communication, host server 110, data storage 112, mobile device 114, and terminal 116 may be coupled to network 118 and/or connected through communication links that allow information to be exchanged using, for example, conventional communication protocols and/or data port interfaces. Although a specific numbers of servers, mobile devices, and terminals are shown in FIG. 1, FIG. 1 is exemplary and any numbers of server, mobile device, and terminal may be provided. Furthermore, the functions provided by one or more devices of system 100 may be combined or substituted.

In the exemplary embodiment of FIG. 1, host server 110 may be coupled to other systems (not shown) via network 118, or may directly access other systems, data storages, or other network applications. In some embodiments, information sent over network 118 may be encrypted to ensure the security of the data being transmitted. Network 118 may be a shared, public, or private network, and may be implemented through any suitable combination of wired and/or wireless communication networks. Furthermore, network 118 may comprise a local area network (LAN), a wide area network (WAN), an intranet, and/or the Internet.

Host server 110 may comprise a computer (e.g., a personal computer, network computer, server, or mainframe computer) having one or more processors (not shown) that may be selectively activated or reconfigured by a computer program or computer-readable storage medium with programmed instructions. Consistent with embodiments of the present invention, host server 110 may comprise one or more application servers using session information protocol (SIP) or other signaling protocols. Host server 110 may also distribute data for parallel processing by one or more additional servers (not shown). Host server 110 may also be implemented in a distributed network. Alternatively, host server 110 may be specially constructed for carrying-out methods consistent with embodiments of the invention.

Host server 110 may include or utilize data storage 112 for storing program modules which, when executed by a processor, perform one or more processes for providing a location-based chat session or a location-based data feed. In other embodiments, data storage 112 may also store data associated with mobile device 114 and terminal 116. For example, data storage 112 may include location data associated with mobile device 114 and a predetermined geographic region received from terminal 116 or otherwise defined by a user. Location data for mobile device 114 may be acquired directly from mobile device 114 or via a mobile network (not shown). Data storage 112 may be one or more memory devices that store data as well as software and may also comprise, for example, one or more of volatile or non volatile semiconductor memories, magnetic storage, or optical storage. Although shown as separate entities in FIG. 1, host server 110 and data storage 112 may be combined. For example, host server 110 may include one or more data storage components in addition to or instead of data storage 112. Furthermore, host server 110 and data storage 112 may directly exchange data or exchange data via network 118.

Terminal 116 may be any type of device for communicating with at least one of host server 110, data storage 112, and mobile device 114 over network 118. For example, terminal 116 may be a personal computer, mobile communication device, or any other appropriate computing platform or device capable of exchanging data with network 118. Terminal 116 may include a processor (not shown) and a memory (not shown). Furthermore, terminal 116 may execute program modules that provide one or more graphical user interfaces (GUIs) for interacting with network resources and/or accessing data provided by host server 110. Alternatively, or in addition, terminal 116 may locally execute program modules providing GUIs without accessing host server 110.

Figure 2:
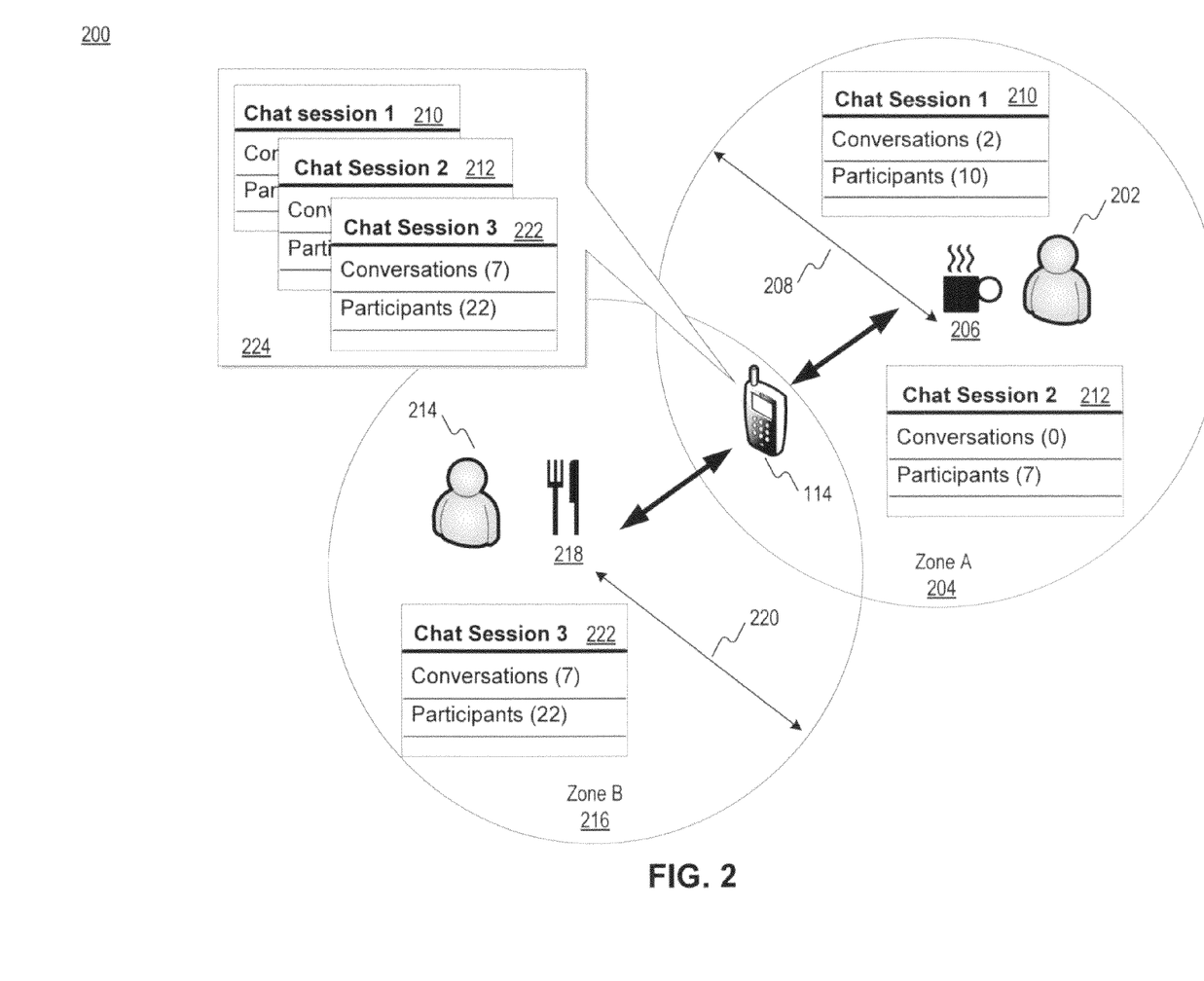
FIG. 2 is a diagram illustrating an exemplary location-based chat session, consistent with embodiments of the present invention.

FIG. 2 is a diagram 200 illustrating an exemplary location-based chat session, consistent with embodiments of the present invention. Although the exemplary embodiment of FIG. 2 is described with reference to chat sessions, it will be appreciated that other forms of electronic communication, such as instant messaging, text messaging and voice communication, may be provided. Consistent with embodiments of the invention, a chat session may include one of several methods of communicating over the Internet. For example, a chat session may include real-time communication between a user and another user. A chat session may also include communication between a user and many users participating in a group chat session. In such a case, group chat session participants may be associated as members of a user's group. In some cases, membership in a user's group may be open to the public. In other cases membership may configured by a chat session initiator to limit access based on user name, age, geography, or other conditions. In some embodiments, a chat session initiator may include a user or a user's group member. Communication formats between chat session participants may include, but not limited to, text, audio, video, and images.

Consistent with embodiments of the invention, the current location of a user may be used as a criterion for starting or entering a chat session. The chat session may be controlled or restricted by a chat session initiator. Among other parameters, the chat session initiator may define a geographic area, such that only users that are within the geographic area will be able to access the chat session. The geographic area may be defined as a designated distance away from a point of interest or a current location of the chat session initiator. Once created, other users may access a chat upon receiving a notification to join the chat session or by searching for a nearby chat session. Search results may be presented to a user as a list of chat sessions or chatroom names and the number of participants (see examples presented in FIG. 2). Other features may be provided, such as a login or authentication check to validate that user is authorized to join a chat session.

As shown in the example of FIG. 2, diagram 200 includes first chat session initiator 202 located at first location 206 and a second chat session initiator 214 located at a second location 218. First chat session initiator 202 may establish a location-based chat session associated with a predetermined geographic region related to first location 206. For example, first chat session initiator 202 may initialize chat session 1 210 and chat session 2 212 associated with predetermined geographic region zone A 204. In a similar manner, second chat session initiator 214 may initialize chat session 3 222 associated with predetermined geographic region zone B 216.

Consistent with embodiments of the present invention, a device within a predetermined geographic region may access an associated location-based chat session. In some embodiments, a device may be a terminal (not shown), including a personal computer, or other like devices capable of communicating with host server 110. In other embodiments, a device may be a mobile communication device, such as mobile device 114. Mobile device 114, may include a smart phone, personal media player, or other similar device. Mobile device 114, may also include mobile user interface 224 configured to display information received from network 118, devices coupled to network 118, other wired or wireless communication sources, or computer-readable storage media. As shown in FIG. 2, mobile user interface 224 may include a selection of one or more chat sessions based on the current location of mobile device 114. Mobile device 114 may be located within predefined geographic regions zone A 204 and zone B 216. Notifications of chat sessions associated with zone A 204 and zone B 216 may be received by mobile device 114 and displayed on mobile user interface 224. As illustrated in FIG. 2, mobile user interface 224 may include chat session notifications corresponding to chat session 1 210, chat session 2 212, and chat session 3 222. Chat session notification may include a visual indicator as shown in FIG. 2, and audible indicator, electronic message, or similar indicator.

In embodiments consistent with the present invention, a predetermined geographic region associated with a location-based chat session may include, but is not limited to, a point of interest, a region configured based on proximity to a point of interest, and a distance away from a chat session initiator. For example, zone A 204 may be defined by first chat session initiator 202 as first distance 208 from first location 206. A first distance 208 may be defined by a chat session initiator using a user interface on a terminal or mobile computing device capable of communicating with host server 110. The user interface may allow a user, such as chat session initiator, to enter first distance 208 along with other chat session initiation information. Other chat session initiation information may include, but is not limited to, a current location of the chat session initiator, a chat session name, chat session permissions, and/or similar information.

Figure 3:
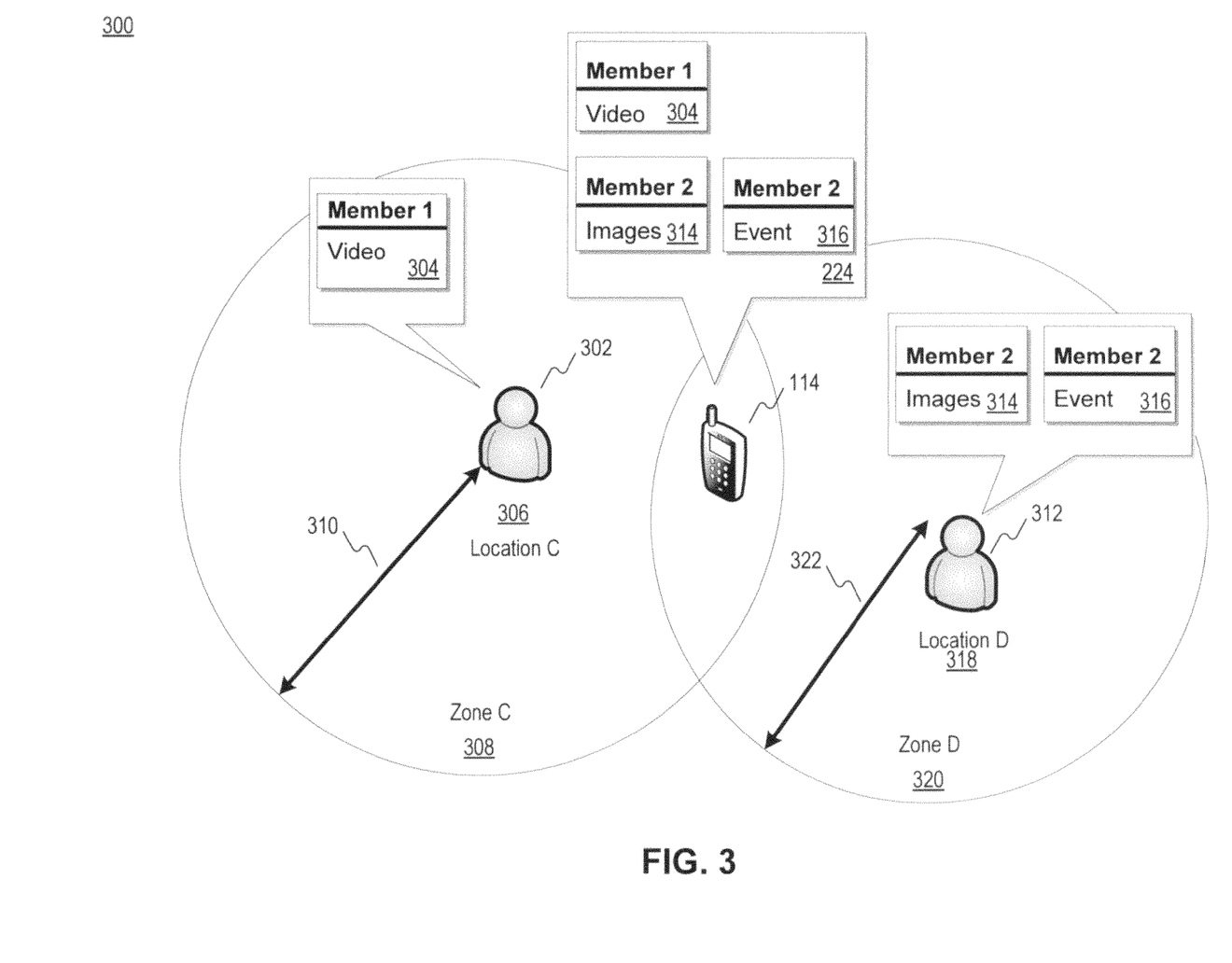
FIG. 3 is a diagram illustrating an exemplary location-based data feed, consistent with embodiments of the present invention.

FIG. 3 is a diagram 300 of an exemplary location-based data feed, consistent with embodiments of the present invention. The data feed may comprise any form of an electronic data feed, such as text, an image, and streaming content (audio and/or video).

Consistent with embodiments of the invention, a location-based data feed may provide users with information, which is specific or relevant to the current location of the user. Such information may include pictures, videos, comments and other content uploaded by other users, such as members of a user's group or social network or members of the general public. Uploaded content may be location tagged within a specific geographic region and include, for example, nearby event listings or available chat sessions. The specific geographic region may be defined, for example, relative to a point of interest or a predetermined radius from the current location of a user.

As shown in the example of FIG. 3, diagram 300 includes predetermined geographic region zone C 308, predetermined geographic region zone D 320, location-based data feeds 304, 314, and 316, and mobile device 114. Location-based data feeds 304, 314, and 316 may include location-tagged information uploaded to host server 110 by member 1 302 and member 2 312, respectively. As disclosed herein, a location-based data feed may include an image, a video data stream, an audio data stream, or an electronic message, such as a text message or an email. In other embodiments, a location-based data feed may also include comments uploaded from users that have accessed a particular location-based data feed.

In some embodiments consistent with the present invention, a predetermined geographic region associated with a location-based data feed may include, but is not limited to, a point of interest and a region configured based on proximity to a point of interest. For example, zone C 308 may be defined by member 1 302 as first distance 310 from location C 306. In some embodiments, first distance 310 may set by member 1 302 using a user interface on a terminal or mobile computing device capable of communicating with host server 110. For example, member 1 302 may enter first distance 310 relative to a current location, such as location C 306. In other embodiments, member 1 302 may enter first distance 310 relative to a point of interest or other geographic reference point. A point of interest may include a landmark, an event, a geographic location, or the like. In other embodiments, member 1 302 may enter first distance 310 in conjunction uploading location-based data feed 304.

Member 2 312 may configure predetermined geographic region zone D 320 in a similar manner. For example, member 2 312 may enter second distance 322 relative to a current location, such as location D 318. In other embodiments, member 2 312 may enter second distance 322 relative to a point of interest or other geographic reference point. In other embodiments, member 2 312 may enter second distance 310 in conjunction with uploading location-based data feeds 314 and 316.

As shown in FIG. 3, mobile device 114 may include mobile user interface 224 as previously described. Consistent with embodiments of the present invention, mobile user interface 224 may include a selection of one or more location-based data feeds based on the current location of mobile device 114. For example, mobile device 114 may be located within predetermined geographic regions zone C 308 and zone D 320. Location-based data feeds associated with zone C 308 and zone D 320 may be received by mobile device 114 and displayed on mobile user interface 224. As illustrated in FIG. 3, mobile user interface 224 may include location-based data feeds corresponding to first data feed 304, second data feed 314, and third data feed 316. Mobile user interface 224 may also include a notification associated with particular location-based data feed. Notifications may be displayed on mobile user interface 224 using a visual indicator, an audible indicator, electronic message, or similar indicator.

Figure 4:
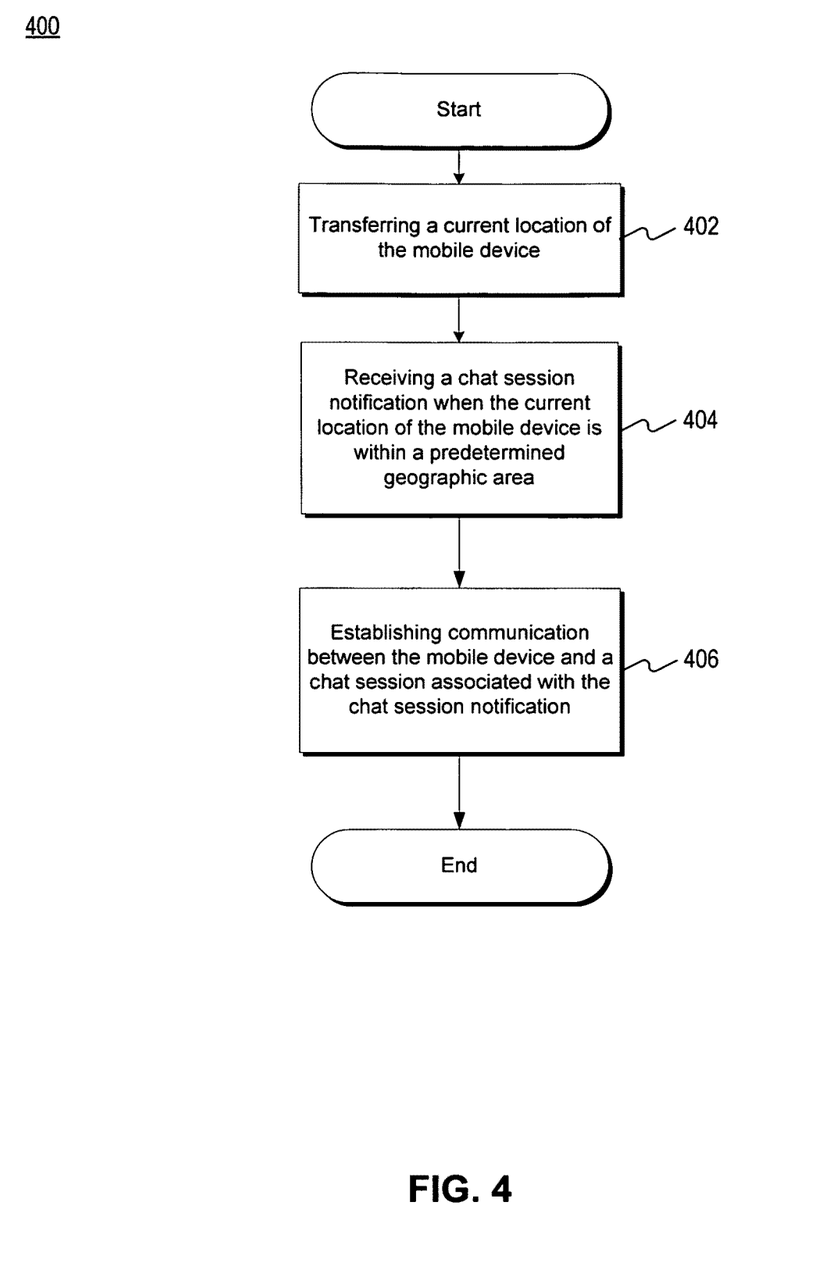
FIG. 4 is a flowchart of an exemplary method for accessing a location-based chat session, consistent with embodiments of the present invention.

FIG. 4 is a flowchart 400 of an exemplary method for accessing a location-based chat session, consistent with embodiments of the present invention. By way of example, the exemplary method of FIG. 4 may be implemented with mobile device 114 when located in predetermined geographic regions zone A 204 or zone B 216, as illustrated in FIG. 2. As will be appreciated, the method of FIG. 4 may be adapted for other types of electronic communication and, therefore, is not limited to chat sessions.

In step 402, a mobile device may transfer its current location. For example, mobile device 114 may transfer its current location to host server 110 coupled to network 118. In some embodiments, the current location of mobile device 114 may be provided automatically to host server 110 via a mobile communication network (e.g., network 118 or a separate network connected thereto) within which mobile device 114 is operating or roaming. In other embodiments, the current location of a mobile device may be entered using a menu selection on a user interface associated with the mobile device. The menu selection, in some embodiments, may include location information obtained automatically from a GPS source or other communication transmitters associated with the mobile device. Alternatively, the menu selection may also include current location information previously stored on storage device 112 and received from host server 110. For example, the previously stored current location may be determined when the mobile user initiates communication with host server 110 using mobile device 114. The determination may be made automatically based on information received from equipment associated with network 118 or, a GPS source or other communication transmitters associated with mobile device 114. In other embodiments, the determination may be made manually. For example, during a manual determination, host server 110 may request location information from mobile device 114 via network 118. In some embodiments, the request may be a voice prompt or other audible prompt received by mobile device 114. In other embodiments, the request may include a visual prompt on mobile user interface 224, such as a text message, instant message, email, or other similar indicator. A mobile user, in response to the prompt, may use mobile user interface 224 to enter the current location of mobile device 114. The current location may be entered in several formats, such as a street address, latitude-longitude, other geographic reference format. Under either embodiment, the current location information may be received by host server 110 and stored on to data storage 112 or other storage media accessible by host server 110.

In step 404, a chat session notification may be received by a mobile device when the current location of the mobile device is within a predetermined geographic region. For example, mobile device 114 may receive a notification of an available chat session based on the determination of the current location of mobile device 114. For example, as shown in FIG. 2, mobile device 114 receives chat session notifications based on its current location and proximity to predetermined geographic regions. Using mobile user interface 224, chat session notifications may be viewed on mobile device 114. In some embodiments, chat session notifications may also include audible indicators, which may or may not include an associated visual indicator displayed on mobile user interface 224. In other embodiments, a received chat session notification may also be based on a user's group permission defined by the chat session initiator. For example, the chat session initiator may configure a notification associated with a chat session to be viewable by members of one or more user's groups within a predetermined geographic area.

In step 406, communication may be established between the mobile device and a chat session associated with a particular chat session notification. In some embodiments, communication may be established in response to selecting a received chat session indicator. A received chat session notification may be selected using mobile user interface 224. For example, using mobile user interface 224, a mobile user may select an icon or a specific notification from a list of available notifications. Activation may also include responding to an electronic message, such as an email, text message, instant message or similar communication. The response may include an anonymous call-sign (i.e., not a user's screen name or other recognized name) associated with the mobile device user to maintain privacy. In some embodiments, an anonymous call sign for each location-based chat session member may be included in the chat session notification. Accordingly, the identity of participants associated with a particular chat session may be better protected. In other embodiments, selection may occur automatically based on membership in a particular user's group. For example, mobile device 114 may be associated with a particular user's group having access permission to a particular location-based chat session. In some embodiments, a chat session initiator may configure access permission to a particular location-based chat session based on membership in a particular user's group. Initialization information, including access permissions, may be provided to host server 110 through network 118 by a chat session initiator. Host server 110 may process the initialization information and establish communication with a mobile device by associating specified access permissions with user's group members. User's group membership information may be previously stored in data storage 112 or in a combination of storage media accessible by host server 110.

In one embodiment, proper age limitations and/or other restrictions may be set for chat sessions. For example, when a user under 18 creates a chat session, only others that are under 18 may access the chat. Similarly, when a user that is 18 or older creates a chat session, only users that are at least 18 may be permitted to join that chat session. Additional identification requirements may be implemented to grant or restrict access when establishing a chat session. For example, when a user fails to provide proper identification when attempting to access an electronic communication session, such as a chat session, access to the communication session may be denied.

Figure 5:
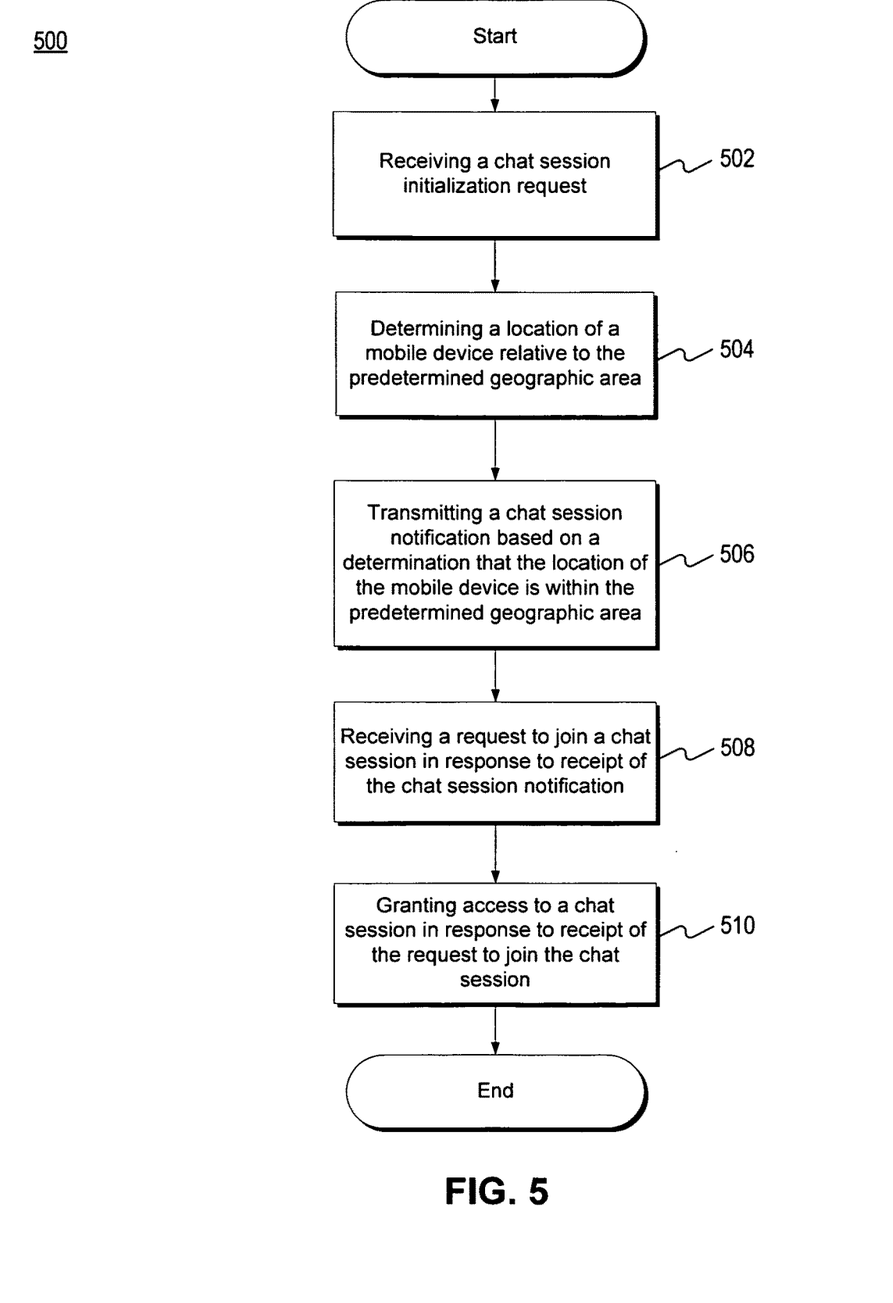
FIG. 5 is a flowchart of an exemplary method for providing a location-based chat session, consistent with embodiments of the present invention.

FIG. 5 is a flowchart 500 of an exemplary method for providing a location-based chat session, consistent with embodiments of the present invention. For example, the method may be implemented by first and second chat initiators 202 and 214, respectively, to provide location-based chat sessions in predetermined geographic regions zone A 204 or zone B 216, as illustrated in FIG. 2.

In step 502, a chat session initialization request may be received at a host server to establish a location-based a chat session. For example, host server 110 may receive a chat session initialization request from first chat session initiator 202. In some embodiments, the chat session initialization request may include a predetermined geographic area associated with a chat session. The predetermined geographic area may include a point of interest. A point of interest may include a landmark, an event, or a geographic location. The predetermined geographic region may also include a region configured based on proximity to the point of interest or a distance from the chat session initiator. For example, predetermined geographic region zone A 204 may be defined by first chat session initiator 202 as first distance 208 from location 206. Similarly, predetermined geographic region zone B 216 may be defined as second distance 220 from location 218. In other embodiments, the chat session initialization request may further include a chat session name, a chat session size limit, and/or chat session permission settings. The network may pass the chat session initialization request to the host server which creates a chat session using the parameters specified by the chat session initiator. The chat session may be established on the server and may be accessible by other users meeting the predefined criteria set forth in the chat session initialization request and in accordance with steps 504, 506, 508, and 510 described below.

In step 504, the location of a mobile device accessing a location-based chat session may be determined relative to a predetermined geographic region. In some embodiments, a host server may receive geo-location data associated with a mobile device from the mobile device. For example, host server 110 may receive geo-location data associated with mobile device 114 in response to a query transmitted through network 118. In other embodiments, host server 110 may receive previously stored geo-location data associated with mobile device 114 from data storage 112 or other equipment coupled to network 118. In some embodiments, geo-location data may include GPS coordinate data, latitude-longitude data, or a physical address. Upon receiving geo-location data associated with a mobile device, host server 110 may compare the geo-location data with the predetermined geographic region. Based on the comparison, host server 110 may determine whether mobile device 114 is located within a predetermined geographic region associated with a location-based chat session.

In step 506, a chat session notification may be transferred to a mobile device based on the determination in step 504. For example, when mobile device 114 is located within either predetermined geographic region zone A 204 or zone B 216, host server 110 may transfer associated chat session notifications. Host server 110 may transfer a chat session notification to mobile device 114 using networking equipment (not shown) coupled to network 118. In some embodiments, chat session notification may include visual indicator, an audible indicator, or an electronic message. In one embodiment, the notification includes an invitation to join the chat session, along with information identifying the chat session and any restrictions related thereto.

In step 508, a host server may receive a request to join a location-based chat session from a mobile device. For example, host server 110 may receive a request to join location-based chat session 1 210 from mobile device 114. In some embodiments, the request may be received in response to selecting a chat session notification received by mobile device 114. In some embodiments, the request may include information associated with mobile device 114, such as user's group membership, an anonymous call sign, or permission data. In some embodiments, permission data may include age or content restrictions.

In step 510, a host server may grant access to a location-based chat session in response to a request described in step 508. For example, host server 110 may process a request from mobile device 114 to join a location-based chat session. Processing may include comparing at least one of permission data, user's group data, or other data received from a mobile device with chat session initialization data provided by the chat session initiator. Based on a valid comparison, a host server may provide a mobile device located within a predetermined geographic region access to the associated location-based chat session. A valid comparison may include compliance with permission data, such as an age requirement or membership in a required user's group.

Figure 6:
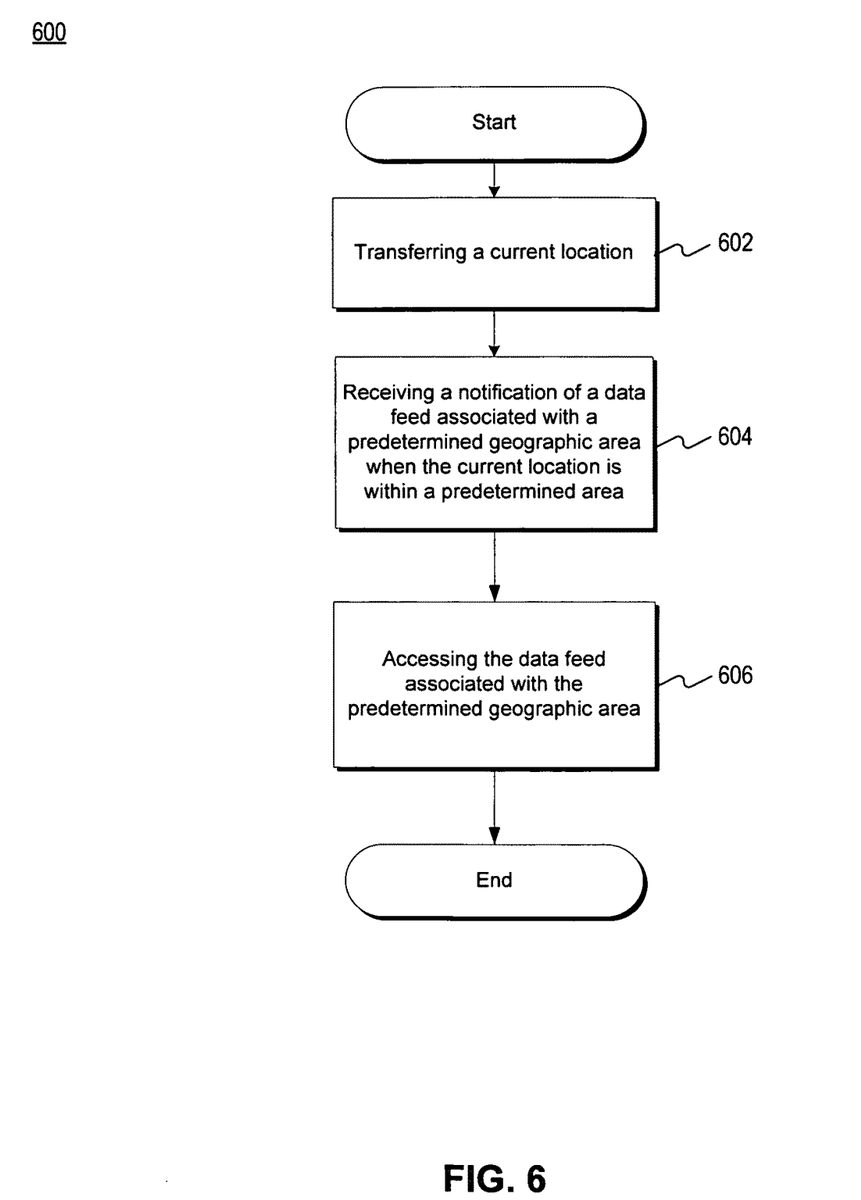
FIG. 6 illustrates steps in an exemplary method for accessing a location-based data feed consistent with embodiments of the present invention.

FIG. 6 is a flowchart 600 of an exemplary method for accessing a location-based data feed, consistent with embodiments of the present invention. By way of example, the exemplary method of FIG. 6 may be implemented by mobile device 114 when located in predetermined geographic regions zone C 308 or zone D 320, as illustrated in FIG. 3. As will be appreciated, the example of FIG. 6 is not limited to data feeds, and may be adapted for other types electronic content.

In step 602, a mobile device may transfer its current location. For example, mobile device 114 may transfer its current location to host server 110 coupled to network 118. By providing a current location of mobile device 114, host server may determine which location-based data feeds may be accessed by mobile device 114. In some embodiments, the current location of mobile device 114 may be provided automatically to host server 110 via a mobile communication network (e.g., network 118 or a separate network connected thereto) within which mobile device 114 is operating or roaming. In other embodiments, the current location of a mobile device may be entered using a menu selection on a user interface associated with the mobile device. The menu selection, in some embodiments, may include location information obtained automatically from a GPS source or other communication transmitters associated the mobile device. Alternatively, the menu selection may also include current location information previously stored. For example, storage device 112 may store previously received current location information from host server 110. In some cases, the previously stored current location may be determined when the mobile user initiates communication with host server 110 using mobile device 114. The determination may be made automatically based on information received from equipment associated with network 118, such as triangulation data based on signal strength. An automatic determination may also be made based on GPS sources or other transmitters associated with mobile device 114 suitable to transmit geo-location information. In other embodiments, the determination may be made manually. For example, during a manual determination, host server 110 may request location information from mobile device 114 via network 118. In some embodiments, the request may be a voice prompt or other audible prompt received by mobile device 114. In other embodiments, the request may include a visual prompt on mobile user interface 224, such as a text message, an instant message, an email, other similar indicator. A mobile user, in response to the prompt, may use mobile user interface 224 to enter the current location of mobile device 114. The current location may be entered in several formats, such as a street address, latitude-longitude, other geographic reference formats. In turn, the current location information may be received by host server 110 and stored on to data storage 112.

In step 604, a notification of a location-based data feed may be received by a mobile device when the current location of the mobile device is within a predetermined geographic area. For example, mobile device 114 may receive a notification of an available location-based data feed based on the determination of the current location of mobile device 114. For example, as shown in FIG. 3, mobile device 114 may receive location-based data feed notifications based on a predetermined geographic region associated with its current location. Using mobile user interface 224, a location-based data feed notification may be viewed on mobile device 114. In some embodiments, location-based data feed notifications may also include audible indicators, which may or may not include an associated visual indicator displayed on mobile user interface 224. In other embodiments, a received location-based data feed notification may also be based on a user's group permission defined by the user that uploaded the data feed.

In certain embodiments, a user may be required to pre-register or opt-in to receive notifications concerning location-based feeds. In other words, notifications will not be sent or provided in an interruptive manner unless the user has opt-in ahead of time. As a result, a user may request to be alerted when there are feeds present relative to their current location, but such notifications will not be sent as a default unless the user has setup for such notifications. In addition, users that have registered for notifications may also be required to request a location-based data feed before viewing or otherwise accessing the content.

Referring again to the example of FIG. 6, in step 606 a mobile device may access a location-based data feed associated with a predetermined geographic region. In some embodiments, communication may be established in response to selecting a received location-based data feed notification. For example, a location-based data feed notification received by mobile device 114 may be selected using mobile user interface 224. Selection may include selecting an icon or a specific notification from a list of available notifications displayed on mobile user interface 224. Selection may also include responding to an electronic message, such as an email, a text message, an instant message or similar communication. In some embodiments, selection may occur automatically based on membership in a particular user's group. For example, mobile device 114 may be associated with a particular user's group having access permission to a particular location-based data feed.

In some embodiments, a user posting the location-based data feed may configure access requirements to a particular location-based data feed based on membership in a particular user's group. For example, member 1 302 may set access requirements when uploading location-based data feed 304. In turn, the access requirements may be provided to host server 110 through network 118. Host server 110 may process the access requirements and establish communication with a mobile device by associating specified access permissions with user's group members. User's group membership information may be previously stored in data storage 112 or in a combination of storage media accessible by host server 110.

In some embodiments, a user accessing a location-based data feed may also upload comments about the data feed. Comments may be uploaded from a receiving device to a host server via network 118. Comments may be identified by a user name, anonymous call-sign, or the like associated with the receiving device user.

Figure 7:
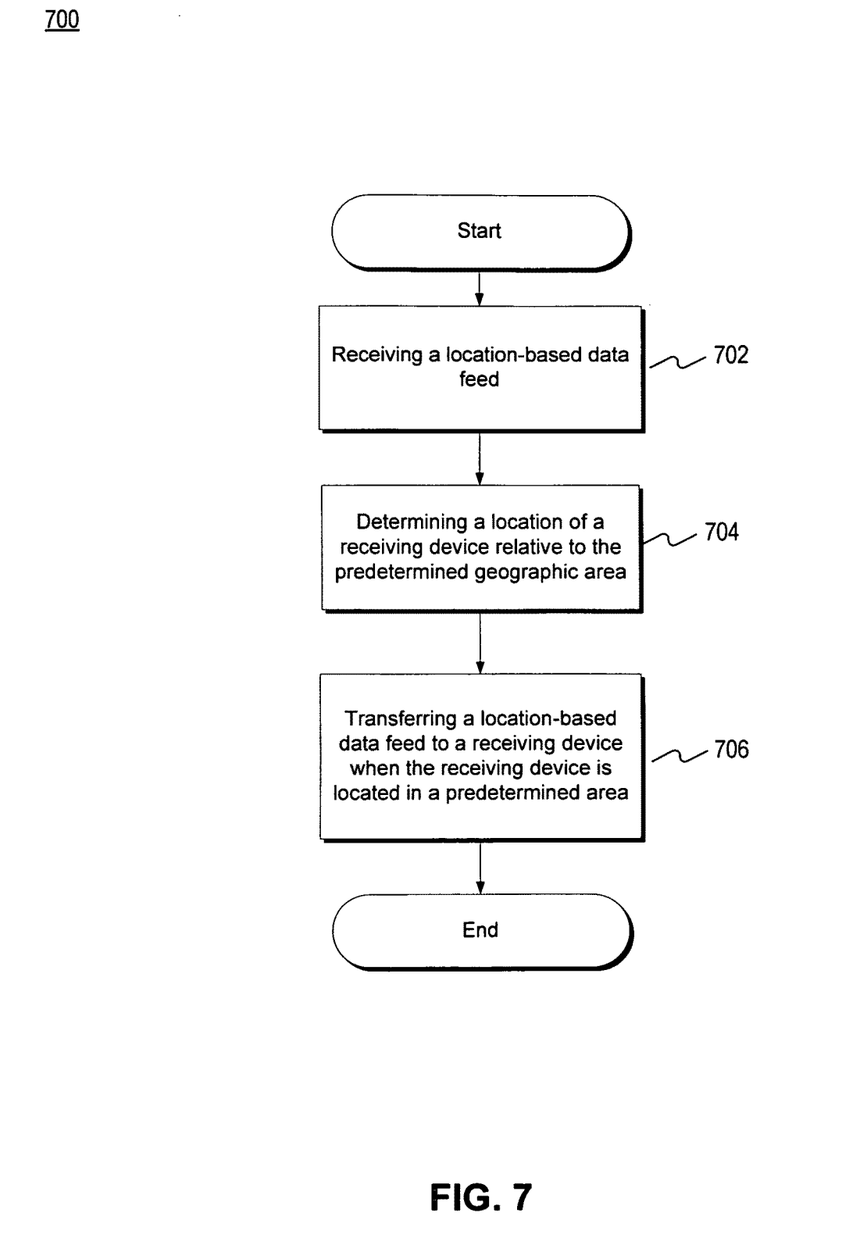
FIG. 7 illustrates steps in an exemplary method for providing a location-based data feed consistent with embodiments of the present invention.

FIG. 7 is a flowchart 700 of an exemplary method for providing a location-based data feed, consistent with embodiments of the present invention. For example, the exemplary method of FIG. 7 may be implemented by first and second members 302 and 312, respectively, to provide location-based data feeds in predetermined geographic regions zone C 308 or zone D 320, as shown in FIG. 3.

In step 702, a location-based data feed may be uploaded from a first device to a host server. For example, host server 110 may receive location-based data feed 304 from first member 302 at location C 306. The network may pass location-based data feed 304 to host server 110 using parameters specified by first member 302. Location-based data feed 304 may be established on host server 110 and may be accessible by other users based on the parameters specified by first member 302 and in accordance with steps 704 and 706 described below. In some embodiments, location-based data feed 304 may be uploaded using a terminal or other computing device (not shown) capable of communicating with host server 110. Similarly, location-based data feeds 314 and 316 may be uploaded to host server 110 by member 2 312 at location D 318. In some embodiments, locations C 306 and D 318 may include any one of a landmark, an event, or a geographic location. Consistent with embodiments of the present invention, a location-based data feed may include content and associated location information. Content may include multimedia data, such as one or a combination of images, video, audio, and text. Text may include comments associated with image, video, or audio. Location information may include geo-location data corresponding to the location of the device used to upload the data feed. For example, location-based data feed 304 may include video content and geo-location data referencing location C 306. In some embodiments, geo-location data may include any one or a combination of GPS data, latitude-longitude coordinates, and physical address data. Location information may also include, predetermined geographic region associated with the geo-location data. As previously discussed, the predetermined geographic region may determine the area in which a particular location-based data feed may be accessed by a receiving device. For example, in some embodiments, a predetermined geographic region may be configured based on proximity to the location of a user when a location-based data feed is uploaded to a host server. In other embodiments, a predetermined geographic region may be configured based on proximity to a point of interest. A point of interest may include a landmark, an event, or a geographic location. For example, predetermined geographic region zone C 308 may be defined by member 1 302 as first distance 310 from location C 306. Similarly, predetermined geographic region zone D 318 may be defined by member 2 312 as second distance 322 from location D 318.

In other embodiments, a location-based data feed may also include a time stamp data. A time stamp associated with a location-based data feed may indicate when the data feed was received by a host server. In other embodiments, a time stamp may indicate when the data feed was transmitted by a terminal or mobile device used to upload the data feed. The time stamp may be based on an internal time source associated with host server 110. Alternatively, a time source may be based on an external source associated with other equipment coupled to network 118, such as a cesium clock source.

In step 704, a determination is made whether a receiving device is located within a predetermined geographic region. In some embodiments, a host server may receive geo-location data associated with a receiving device from the receiving device. A receiving device may include a terminal (not shown) or other computing device capable of communicating with host server 110. For example, host server 110 may receive geo-location data associated with mobile device 114 in response to a query transmitted through network 118. In some embodiments, geo-location data may include GPS coordinate data, latitude-longitude data, or a physical address. Upon receiving geo-location data associated the receiving device, host server 110 may compare the geo-location data with the predetermined geographic region. Based on the comparison, host server 110 may determine whether the location of receiving device is within the predetermined geographic region.

In step 706, a host server may transfer a location-based data feed to a receiving device based on the determination in step 704. For example, when mobile device 114 is located within either predetermined geographic region zone C 308 or zone D 320, host server 110 may transfer associated location-based data feeds. Host server 110 may transfer a location-based data feed to mobile device 114 using networking equipment (not shown) coupled to network 118.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. It is intended that the specification and examples be considered as exemplary only, with a true scope and spirit of the invention being indicated by the following claims.

What is claimed is:

1. A method for providing a location-based data feed, the method comprising:
    providing, at a host server, group membership information for a defined by a first user;
    receiving, at the host server, data uploaded from a first device belonging to the group, wherein the data uploaded from the first device is associated with the location;
    determining, by the host server, whether a second device is within the predetermined geographic region associated with the location,
    determining, by the host server, whether the second device belongs to the group based on the group membership information; and
    transferring, automatically from the host server without selection of a notification of the data by a user of the second device, the data uploaded from the first device to the second device based on a determination that the second device is within the predetermined geographic region and that the second device belongs to the group.

2. The method of claim 1, wherein the data uploaded from the first device comprises location information, the predetermined geographic region, and multimedia content.

3. The method of claim 2, wherein the location information comprises at least one of GPS data, latitude-longitude coordinates, and physical address.

4. The method of claim 1, wherein the data uploaded from the first device includes a time stamp.

5. The method of claim 1, wherein the first device is one of a mobile device and a computer terminal.

6. The method of claim 1, wherein the location comprises at least one of:
    a landmark;
    an event; and
    a geographic location.

7. The method of claim 1, wherein the second device is a mobile device.

8. The method of claim 1, wherein the predetermined geographic region is defined based on a proximity to a point of interest.

* * * * *